United States Patent
Sueki et al.

(10) Patent No.: US 7,014,927 B2
(45) Date of Patent: Mar. 21, 2006

(54) MAGNETIC RECORDING MEDIUM

(75) Inventors: Minoru Sueki, Kanagawa (JP); Ryota Suzuki, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 32 days.

(21) Appl. No.: 10/738,308

(22) Filed: Dec. 18, 2003

(65) Prior Publication Data
US 2004/0131892 A1 Jul. 8, 2004

(30) Foreign Application Priority Data
Dec. 27, 2002 (JP) ............... P. 2002-382582

(51) Int. Cl.
*G11B 5/70* (2006.01)
(52) U.S. Cl. .................................. 428/842
(58) Field of Classification Search ............ 428/141, 428/328, 336, 694 BR, 842
See application file for complete search history.

(56) References Cited

U.S. PATENT DOCUMENTS 6,007,896 A * 12/1999 Bhushan .............. 428/141
6,207,252 B1 3/2001 Shimomura
2002/0102438 A1 * 8/2002 Saito et al. ........... 428/694 BR

FOREIGN PATENT DOCUMENTS

| EP | 0 061 769 A2 | 10/1982 |
| EP | 0 174 376 A1 | 3/1986 |
| EP | 0 530 733 A1 | 3/1993 |
| EP | 0 778 308 A1 | 6/1997 |
| EP | 0 962 919 A1 | 12/1999 |
| JP | 8-279135 A | 10/1996 |
| JP | 9-134515 A | 5/1997 |
| JP | 11-175951 A | 7/1999 |
| JP | 2000-268343 A | 9/2000 |

OTHER PUBLICATIONS

European Search Report dated Mar. 11, 2004.

* cited by examiner

*Primary Examiner*—Stevan A. Resan
(74) *Attorney, Agent, or Firm*—Sughrue Mion, PLLC

(57) ABSTRACT

A magnetic recording medium comprising: a support; and at least one magnetic layer containing a ferromagnetic powder and a binder, wherein a center line average roughness of the magnetic layer measured with a laser interferometer is from 1 to 3 nm, a skewness is 0 or more and less than 1.0, and a maximum difference of elevation of peak/valley is 50 nm or less.

9 Claims, No Drawings

MAGNETIC RECORDING MEDIUM

FIELD OF THE INVENTION

The present invention relates to a magnetic recording medium, in particular, to a magnetic recording medium which is excellent in durability and electromagnetic characteristics and suitable for high density recording.

BACKGROUND OF THE INVENTION

Coating type magnetic recording media are widely used in the fields of the recording tape, video tape and flexible disc. These types of magnetic recording media have a layer structure comprising a nonmagnetic support having laminated thereon a magnetic layer containing ferromagnetic powder and a binder. With the development of an information-oriented society, higher levels of characteristics, e.g., electro-magnetic characteristics, running durability and running performance are required of the magnetic recording media. That is, the audio tape for recording and reproducing music is required to have a higher level of original sound-reproducing performance, and the video tape is required to have excellent electromagnetic characteristics, such as excellent original image-reproducing performance.

For these requirements, improvements have been done mainly from two aspects of the magnetic characteristics of the medium and the surface conditions of the medium.

With respect to the improvement of the magnetic characteristics of the medium, a magnetic recording medium comprising a magnetic layer having high coercive force was proposed as a magnetic recording medium capable of obtaining excellent electromagnetic characteristics. It is reported that excellent electromagnetic characteristics can be obtained in this magnetic recording medium by making the ratio of the coercive force of the magnetic layer (Hc) to the residual magnetic flux density (Br) (i.e., Hc/Br) from 560 to 1,240 kA/(T·m), and further making the coercive force of the magnetic layer (Hc) from 160 to 240 kA/m (e.g., refer to JP-A-2000-268343).

However, in the environment where high durability is required, such as the case of performing recording and reproduction with a magnetic head of higher revolution, it is difficult to ensure high durability by the improvement of the magnetic characteristics of a medium alone. In particular, in the equipment for high density recording in recent years, the number of revolutions of the magnetic head drum is increased, and the number of revolutions of the magnetic head of the digital video tape recorder is even 9,600 rpm or higher. Since this engine speed is a far tremendous velocity as compared with 1,800 rpm of the analog video tape recorder for consumer use and 5,000 rpm for business use, the sliding velocity of the magnetic recording medium and the magnetic head is great. Also, the advances in the linear tape systems promote the higher data transfer rate, resulting in the faster tape speed. All these advances require the durable coating on the magnetic recording media.

For the purpose of improving electromagnetic characteristics and increasing recording density, it has been tried to smooth the surface of a magnetic layer to thereby reduce the noise generated from a magnetic recording medium. For example, a magnetic recording medium characterized in that a support having a skewness (Rsk) of from −1 to 4 is used for smoothing the surface has been suggested (e.g., refer to JP-A-8-279135). However, the tribological property of the magnetic layer with a magnetic head or other sliding elements (e.g., a guide roller and the like) lowers when smoothing is advanced thoughtlessly. Accordingly, it was tried to provide convexities on the surface of the magnetic layer for keeping the tribological property (e.g., refer to JP-A-9-134515). However, contrary to the expectations, dropout attributable to the convexities became conspicuous with the increase of recording density. Therefore, surface wherein concavities were predominant over convexities (Rsk was negative) was designed (e.g., refer to JP-A-11-175951). Rsk is a statistic index of concavities and convexities, and that Rsk is smaller than 0 means concavities are predominant over convexities. However, with the latest improvement of recording density, it has been known that these concavities are the cause of noises or dropout. In addition, it has also been found that tribological property deteriorates due to smoothing of surface (the reduction of the number of convexities).

SUMMARY OF THE INVENTION

An object of the present invention is to provide a magnetic recording medium low in noise and excellent in tribological property.

In the magnetic recording medium of the present invention, convexities on the magnetic layer surface are dominating over concavities, but by making the convexity-concavity difference small, noise can be reduced and a magnetic recording medium excellent in tribological property can be provided.

That is, the object of the present invention has been achieved by the magnetic recording medium described below.

(1) A magnetic recording medium comprising a support having provided thereon one or more magnetic layers containing ferromagnetic powder and a binder, wherein the center line average roughness (Ra) of the magnetic layer measured with a laser interferometer is from 1 to 3 nm, the skewness (Rsk) is 0 or more and less than 1.0, and the maximum difference of elevation of peak/valley (Rz) is 50 nm or less.

(2) The magnetic recording medium as described in the above item (1), wherein the thickness of the magnetic layer is from 0.01 to 0.15 $\mu$m.

(3) The magnetic recording medium as described in the above item (1) or (2), wherein a nonmagnetic layer is provided between the magnetic layer and the support.

(4) The magnetic recording medium as described in the above item (1), (2) or (3), wherein the coercive force of the magnetic layer is from 159 to 318 kA/m (from 2,000 to 4,000 Oe).

DETAILED DESCRIPTION OF THE INVENTION

The center line average roughness (Ra), the skewness (Rsk), and the maximum difference of elevation of peak/valley (Rz) of the magnetic recording medium in the invention are described in detail below. In addition, the constitutional elements of the magnetic recording medium, i.e., a magnetic layer, a nonmagnetic layer, a support, a backing layer, a subbing layer, and further, the layer constitution, the manufacturing method, and the physical properties are described in detail.

Center Line Average Roughness (Ra):

The magnetic recording medium in the present invention is a medium which meets the following three items, i.e., (1) the center line average roughness (Ra) is from 1 to 3 nm, (2)

the skewness (Rsk) is 0 or more and less than 1.0, and (3) the maximum difference of elevation of peak/valley (Rz) is 40 nm or less. By satisfying all of these three items, synergistic effects can be obtained, so that the object of the present invention can be accomplished.

The center line average roughness (Ra) is a criterion showing the surface roughness of a magnetic layer, and when this value is greater than 3 nm, the reduction of output in high frequency due to spacing loss becomes conspicuous, which results in the reduction of electromagnetic characteristics. As described above, the center line average roughness (Ra) is from 1 to 3 nm, and preferably from 2.0 to 3.0 nm.

The center line average roughness (Ra) in the present invention was measured with a laser interferometer according to JIS-B0601-1994.

The center line average roughness (Ra) is a criterion showing the surface profile of a magnetic layer. Even when magnetic recording media have the same value of the center line average roughness (Ra) of the magnetic layer, if their skewnesses (Rsk) described below are different, the reproduction output and the generation of dropout of these magnetic recording media are largely influenced by the skewnesses.

Skewness (Rsk):

Skewness (Rsk) is a dimensionless number showing the relativity of the roughness curve to the center line with respect to the roughness curve of a magnetic layer surface. The skewness (Rsk) in the present invention is 0 or more and less than 1.0, and preferably 0 or more and less than 0.5.

Skewness is a value which is measured with a laser interferometer according to JIS-B0601-1994 so with the measurement of center line average roughness (Ra).

Maximum Difference of Elevation of Peak/Valley (Rz):

Maximum difference of elevation of peak/valley (Rz) (hereinafter merely referred to as "Rz") is the difference between the maximum value and the minimum value of elevations in a measured range (185 $\mu$m×250 $\mu$m).

Rz is a value which is also measured with a laser interferometer, and is 50 nm or less, preferably 40 nm or less.

The present invention contrives to improve the performances of a magnetic recording medium by restricting Rz to the above range, to thereby suppress the heights of convexities which cause dropout.

Magnetic Layer:

The case where a polyurethane resin having Tg of from 100 to 200° C. is used as the binder in the magnetic layer of a magnetic recording medium is described below as an example. Polyurethane resins having Tg of from 100 to 200° C. are usable binders in the invention, but binders are not limited thereto.

When a binder containing a polyurethane resin having high Tg is used in a magnetic layer, plastic flow of the magnetic layer due to the frictional heat caused by the slide of recording and reproducing heads with the magnetic layer surface is suppressed, and good film strength and excellent running durability can be obtained. The effect is particularly conspicuous in the case where the magnetic layer is a thin layer.

Tg of the polyurethane resin contained in a binder is from 100 to 200° C., and preferably from 120 to 170° C. When Tg is 100° C. or higher, good running durability can be obtained without reducing the film strength. When Tg is 200° C. or less, a smoothing effect by calendering treatment can be obtained, so that good electromagnetic characteristics and running durability can be ensured.

The polyurethane resin contains urethane groups in concentration of preferably from 2.5 to 6.0 mmol/g, and more preferably from 3.0 to 4.5 mmol/g. When the urethane group concentration is 2.5 mmol/g or higher, Tg of the film becomes high and good durability can be obtained, and when the concentration is 6.0 mmol/g or lower, high solubility in a solvent and good dispersibility can be secured. When the urethane group concentration is excessively high, the polyurethane resin inevitably cannot contain polyol, as a result, molecular weight control becomes difficult, which is not preferred in view of synthesis.

The polyurethane resin has a weight average molecular weight (Mw) of preferably from 30,000 to 200,000, and more preferably from 50,000 to 100,000. When the molecular weight is 30,000 or more, good film strength and excellent durability can be obtained, and when it is 200,000 or less, high solubility in a solvent and good dispersibility can be secured.

As the polar groups of the polyurethane resin, —SO$_3$M, —OSO$_3$M, —PO$_3$M$_2$ and —COOM are preferably used, and —SO$_3$M and —OSO$_3$M are more preferred (wherein M represents a hydrogen atom, an alkali metal or ammonium). The amount of these polar groups is preferably from 1×10$^{-5}$ to 2×10$^{-4}$ eq/g. When the content is 1×10$^{-5}$ eq/g or more, the adsorption of the polyurethane resin onto magnetic powder and nonmagnetic powder is heightened and dispersibility becomes good. While when the content is 2×10$^{-4}$ eq/g or less, high solubility in a solvent and good dispersibility can be secured.

The content of OH groups in the polyurethane resin is preferably from 2 to 20 per a molecule, and more preferably from 3 to 15 per a molecule. When two or more OH groups are contained per a molecule, the polyurethane resin well reacts with an isocyanate hardening agent, and so good film strength and excellent durability can be obtained. On the other hand, when the polyurethane resin contains 15 or less OH groups per a molecule, solubility in a solvent becomes high and good dispersibility can be secured. For introducing OH groups, a compound having trifunctional or higher OH groups, e.g., trimethylolethane, trimethylolpropane, trimellitic anhydride, glycerol, pentaerythritol or hexanetriol, branched polyester or polyether ester having trifunctional or higher OH groups can be used. Of these compounds, trifunctional OH groups are preferred. Tetrafunctional or higher groups expedite the reaction with a hardening agent, as a result, the pot life becomes short.

As the polyol components of the polyurethane resin contained in a binder, well-known polyols, e.g., polyester polyol, polyether polyol, polycarbonate polyol, polyether ester polyol, polyolefin polyol, and diol compounds having a cyclic structure and a long alkyl chain, such as dimer diol, can be used.

The molecular weight of these polyols is preferably from 500 to 2,000 or so. When the molecular weight is in the above range, the weight ratio of diisocyanate can be substantially increased, as a result, urethane bonds increase and the intermolecular interaction is heightened, so that films having a high glass transition temperature and high dynamic strength can be obtained.

The diol components are preferably diol compounds having a cyclic structure and a long alkyl chain. A long alkyl chain means an alkyl group having from 2 to 18 carbon atoms. When a compound has a cyclic structure and a long alkyl chain, the compound comes to have a folded structure, and so the solubility in a solvent becomes excellent. As a result, the molecular chain of urethane adsorbed onto the surface of magnetic powder or nonmagnetic powder in a coating solution can be broadened, thereby dispersion stability can be improved and excellent electromagnetic characteristics can be obtained. In addition, polyurethane having high glass transition temperature can be obtained by being provided with the cyclic structure.

Diol compounds having a cyclic structure and a long alkyl chain are particularly preferably diol compounds represented by the following formulae.

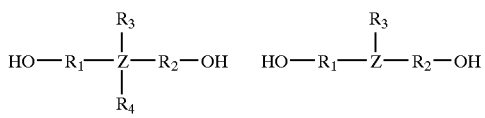

In the above formulae, Z represents a cyclic structure selected from a cyclohexane ring, a benzene ring and a naphthalene ring; $R_1$ and $R_2$ each represents an alkylene group having from 1 to 18 carbon atoms; and $R_3$ and $R_4$ each represents an alkyl group having from 2 to 18 carbon atoms.

The above diol components are preferably contained in the polyurethane resin in an amount of from 10 to 50 mass %, and more preferably from 15 to 40 mass %. When the content of the diol components is 10 mass % or more, solubility in a solvent becomes high and good dispersibility can be secured, and when the content is 50 mass % or less, a film having high Tg and excellent durability can be obtained.

The polyurethane resin can contain diol components other than the above diol components as a chain extender. When the molecular weight of a diol component becomes great, the content of diisocyanate inevitably becomes small, so that the urethane bonds in polyurethane lessen and the film strength deteriorates. Consequently, for obtaining satisfactory film strength, a chain extender to be used in combination with the polyurethane resin is preferably low molecular weight diol having a molecular weight of less than 500, and preferably 300 or less.

The specific examples of chain extenders which can be used in the present invention include aliphatic glycols, e.g., ethylene glycol, 1,3-propanediol, propylene glycol, neopentyl glycol (NPG), 1,4-butanediol, 1,5-pentanediol, 1,6-hexanediol, 1,8-octanediol, 1,9-nonanediol, 2,2-dimethyl-1,3-propanediol, 2-ethyl-2-butyl-1,3-propanediol, and 2,2-diethyl-1,3-propanediol, alicyclic glycols, e.g., cyclohexanedimethanol (CHDM), cyclohexanediol (CHD), and hydrogenated bisphenol A (H-BPA), ethylene oxide addition products and propylene oxide addition products of these alicyclic glycols, aromatic glycols, e.g., bisphenol A (BPA), bisphenol S, bisphenol P and bisphenol F, ethylene oxide addition products and propylene oxide addition products of these aromatic glycols. A particularly preferred chain extender is hydrogenated bisphenol A.

As the diisocyanates for use in the polyurethane resin, well-known diisocyanate compounds, e.g., TDI (tolylene diisocyanate), MDI (diphenylmethane diisocyanate), p-phenylene diisocyanate, o-phenylene diisocyanate, m-phenylene diisocyanate, xylylene diisocyanate, xylylene diisocyanate hydride, and isophorone diisocyanate, can be preferably used.

The polyurethane resin may be used in combination with vinyl chloride series synthetic resins. The vinyl chloride resins which can be used in combination have polymerization degree of preferably from 200 to 600, and particularly preferably from 250 to 450. The vinyl chloride resins may be copolymers of vinyl monomers, e.g., vinyl acetate, vinyl alcohol, vinylidene chloride or acrylonitrile.

The polyurethane resin may be used in combination with various synthetic resins besides the above vinyl chloride resins. As such usable synthetic resins, e.g., ethylene-vinyl acetate copolymers, cellulose derivatives, e.g., nitrocellulose resins, acrylic resins, polyvinyl acetal resins, polyvinyl butyral resins, epoxy resins, and phenoxy resins are exemplified. These synthetic resins may be used alone or in combination.

When the polyurethane resin and these synthetic resins are used in combination in the magnetic layer, the polyurethane resin is contained in an amount of preferably from 10 to 90 mass % in the binder, more preferably from 20 to 80 mass %, and particularly preferably from 25 to 60 mass %. The vinyl chloride resin is contained in an amount of preferably from 10 to 80 mass % in the binder, more preferably from 20 to 70 mass %, and particularly preferably from 30 to 60 mass %.

Further, a hardening agent, e.g., a polyisocyanate compound, can be used with the binder. As the examples of polyisocyanate compounds, the reaction products of 3 mols of tolylene diisocyanate and 1 mol of trimethylolpropane (e.g., Desmodur L-75, manufactured by Bayer Yakuhin, Ltd.), the reaction products of 3 mols of diisocyanate, e.g., xylylene diisocyanate or hexamethylene diisocyanate and 1 mol of trimethylolpropane, biuret addition products with 3 mols of hexamethylene diisocyanate, isocyanurate compounds of 5 mols of tolylene diisocyanate, isocyanurate addition compounds of 3 mols of tolylene diisocyanate and 2 mols of hexamethylene diisocyanate, and isophorone diisocyanate and diphenylmethane diisocyanate polymers can be exemplified.

The polyisocyanate compounds in the magnetic layer is contained in an amount of preferably from 10 to 50 mass % in the binder, and more preferably from 20 to 40 mass %. When the magnetic layer is subjected to hardening treatment with electron beam irradiation, compounds having reactive double bonds, e.g., urethane acrylate, can be used. The total weight of resin components and hardening agents (i.e., the weight of the binder) is generally preferably from 15 to 40 weight parts per 100 weight parts of the magnetic powder, and more preferably from 20 to 30 weight parts.

Ferromagnetic Powder:

In the present invention, the ferromagnetic powders which are used in the magnetic layer have an average long axis length or an average tabular diameter of 60 nm or less. For securing a stable error rate, it is preferred in the present invention to use ferromagnetic powders having the above range of average long axis length or average tabular diameter capable of obtaining a higher S/N ratio.

The average long axis length of the ferromagnetic powders is more preferably from 30 to 50 nm.

The average tabular diameter of the ferromagnetic powders is more preferably from 10 to 35 nm, and particularly preferably from 10 to 25 nm.

It is preferred that the ferromagnetic powders which are used in the magnetic layer in the present invention should be ferromagnetic powders having prescribed coercive force described later. As the ferromagnetic powders usable in the present invention, ferromagnetic metal powders or hexagonal ferrite powders are exemplified.

Ferromagnetic Metal Powder:

The ferromagnetic metal powders for use in the magnetic layer of the present invention are preferably ferromagnetic alloy powders having a specific surface area ($S_{BET}$) measured by the BET method of preferably from 40 to 80 m²/g, and more preferably from 50 to 70 m²/g. The ferromagnetic alloy powders have a crystallite size of preferably from 12 to 25 nm, more preferably from 13 to 22 nm, and particularly preferably from 14 to 22 nm.

As the ferromagnetic metal powders, Fe, Fe—Co, Fe—Ni and Co—Ni—Fe each containing yttrium are exemplified. The yttrium content in the ferromagnetic metal powders is preferably from 0.5 to 20 atomic %, and more preferably from 5 to 10 atomic %, in the atomic ratio of the yttrium atom to the iron atom, Y/Fe. When the yttrium content is 0.5 atomic % or more, high saturation magnetization ($\sigma_s$) of the ferromagnetic metal powders becomes possible, thus improved magnetic characteristics and good electromagnetic characteristics can be obtained. While when the yttrium content is 20 atomic % or less, the iron content is appropriate and improved magnetic characteristics and good electromagnetic characteristics can be obtained. The ferromagnetic metal powders can contain aluminum, silicon, sulfur, scandium, titanium, vanadium, chromium, manganese, copper, zinc, molybdenum, rhodium, palladium, tin, antimony, boron, barium, tantalum, tungsten, rhenium, gold, lead, phosphorus, lanthanum, cerium, praseodymium, neodymium, tellurium or bismuth within the range of 20 atomic % or less to 100 atomic % or iron. In addition, the ferromagnetic metal powders may contain a small amount of water, hydroxide or oxide.

An example of ferromagnetic metal powder usable in the present invention to which cobalt and yttrium are introduced is described below. A method of using as a starting material iron oxyhydroxide obtained by blowing oxidizing gas to a water suspension comprising the mixture of ferrous salt and alkali can be exemplified as such an example. As the kind of iron oxyhydroxide, alpha-FeOOH is preferred. As the manufacturing method of alpha-FeOOH, there are a first method of neutralizing ferrous salt with alkali hydroxide to make a water suspension of Fe(OH)$_2$, and blowing oxidizing gas to the suspension to thereby obtain acicular alpha-FeOOH, and a second method of neutralizing ferrous salt with alkali carbonate to make a water suspension of FeCO$_3$, and blowing oxidizing gas to the suspension to thereby obtain spindle-like alpha-FeOOH. These iron oxyhydroxides are preferably those obtained by reacting an aqueous solution of ferrous salt with an alkali aqueous solution to thereby obtain an aqueous solution containing ferrous hydroxide, and oxidizing this solution by air oxidation and the like. At this time, salts of alkaline earth elements, e.g., Ni salt, Ca salt, Ba salt or Sr salt, or Cr salt or Zn salt may be coexistent with the ferrous salt aqueous solution. By arbitrarily selecting and using these salts, the figure of the particle of magnetic metal powder (axial ratio) can be adjusted.

As the ferrous salts, ferrous chloride and ferrous sulfate are preferred. As the alkalis, sodium hydroxide, aqueous ammonia, ammonium carbonate and sodium carbonate are preferred. As the salts which can be coexistent with ferrous salts, chlorides, e.g., nickel chloride, calcium chloride, barium chloride, strontium chloride, chromium chloride and zinc chloride are preferred. In the case where cobalt is introduced into the iron, an aqueous solution of cobalt compound, e.g., cobalt sulfate or cobalt chloride, is mixed with the slurry of iron oxyhydroxide while stirring before introducing yttrium. After preparing the slurry of iron oxyhydroxide containing cobalt, an aqueous solution containing a yttrium compound is added to the slurry and mixed with stirring, thereby cobalt can be introduced.

Neodymium, samarium, praseodymium and lanthanum can be introduced into the ferromagnetic metal powder of the present invention besides yttrium. These elements can be introduced by using chlorides such as yttrium chloride, neodymium chloride, samarium chloride, praseodymium chloride and lanthanum chloride, and nitrates such as neodymium nitrate and gadolinium nitrate, and two or more of them may be used in combination. The figures of the ferromagnetic metal powders are not especially restricted but acicular, granular, die-like, ellipsoidal and tabular shapes are generally used. Acicular ferromagnetic metal powders are particularly preferably used.

Hexagonal Ferrite Powder:

The examples of hexagonal ferrite powders which are contained in the magnetic layer of the present invention include barium ferrite, strontium ferrite, lead ferrite, calcium ferrite, and the substitution products of these ferrites, e.g., Co substitution products. Specifically, magnetoplumbite type barium ferrite and strontium ferrite, magnetoplumbite type ferrite having covered the particle surfaces with spinel, and magnetoplumbite type barium ferrite and strontium ferrite partially containing spinel phase are exemplified. The hexagonal ferrite powders may contain, in addition to the prescribed atoms, the following atoms, e.g., Al, Si, S, Sc, Ti, V, Cr, Cu, Y, Mo, Rh, Pd, Ag, Sn, Sb, Te, Ba, Ta, W, Re, Au, Hg, Pb, Bi, La, Ce, Pr, Nd, P, Co, Mn, Zn, Ni, Sr, B, Ge and Nb. Hexagonal ferrite powders containing the following elements can be generally used, e.g., Co—Zn, Co—Ti, Co—Ti—Zr, Co—Ti—Zn, Ni—Ti—Zn, Nb—Zn—Co, Sb—Zn—Co and Nb—Zn. According to starting materials and manufacturing processes, specific impurities may be contained.

The tabular diameter of the hexagonal ferrite powder which can be used in the present invention means the longest diameter of the base of the hexagonal pole of the hexagonal ferrite magnetic powder, and the average tabular diameter is the arithmetic mean of it. When reproduction is performed using a magneto-resistance head particularly for increasing track density, it is necessary to reduce noise, consequently the average tabular diameter is preferably 35 nm or less, but when the tabular diameter is in the range of from 10 to 60 nm, stable magnetization not influenced by thermal fluctuation can be obtained and noise can be suppressed, thus the average tabular diameter of the above range is preferred for high density magnetic recording. The tabular ratio (tabular diameter/tabular thickness) is preferably from 1 to 15, and more preferably from 1 to 7. When the tabular ratio is 1 or more, sufficient orientation can be obtained while keeping high packing density in a magnetic layer. When the tabular ratio is 15 or less, the influence by stacking among particles can be almost got rid of and the noise does not increase.

The specific surface area ($S_{BET}$) of the particles having diameters in the above range is preferably from 20 to 200 m²/g. The specific surface area nearly coincides with the value obtained by arithmetic operations from a tabular diameter and a tabular thickness. The distribution of tabular diameter-tabular thickness is generally preferred as narrow as possible. It is difficult to show the distributions in numerical values but distributions can be compared by measuring TEM photographs of 500 particles selected randomly. The distributions are in many cases not regular distributions, but when expressed in the standard deviation to the average size by calculation, σ/average size is from 0.1 to 2.0. For obtaining narrow particle size distribution, it is efficient to make a particle-forming reaction system homogeneous as far as possible, and subject particles formed to distribution-improving treatment as well. For instance, a method of selectively dissolving ultrafine particles in an acid solution is also known.

The coercive force (Hc) measured in hexagonal ferrite powders is generally from 160 to 320 kA/m (from 2,000 to 4,000 Oe) or so. Higher coercive force (Hc) is advantageous for high density recording but Hc is restricted by the capacities of recording heads. Coercive force (Hc) can be controlled by the particle sizes (tabular diameter-tabular thickness), the kinds and amounts of the elements contained, the substitution sites of the elements, and the reaction conditions of particle formation.

Saturation magnetization ($\sigma_s$) of hexagonal ferrite powders is generally from 30 to 80 A·m$^2$/kg, and preferably from 40 to 60 A·m$^2$/kg. Saturation magnetization has the inclination of becoming smaller as particles become finer. For improving saturation magnetization, a method of reducing crystallization temperature or the treatment time at heat treatment temperature, a method of increasing the amount of the compound to be added, and a method of increasing the surface treating amount may be used. W-type hexagonal ferrite can also be used. When magnetic powders are dispersed, the particle surfaces of the magnetic powders may be treated with substances compatible with the dispersion media and the polymers.

Inorganic and organic compounds are used as surface treating agents. For example, oxides or hydroxides of Si, Al and P, various kinds of silane coupling agents, and various kinds of titanium coupling agents are primarily used. The addition amount of these surface treating agents is from 0.1 to 10% based on the amount of the magnetic powder. The pH of magnetic powders is also important for dispersion, and it is generally from 4 to 12 or so. The optimal value of pH is dependent upon the polymer. Taking the chemical stability and the storage stability of magnetic media into consideration, pH of from about 6 to about 11 is selected. The water content in magnetic powders also affects dispersion. The optimal value of the water content is dependent upon the dispersion medium and the polymer, and the water content of from 0.01 to 2.0% is selected in general.

The producing methods of hexagonal ferrites include the following methods and any of these methods can be used in the present invention with no restriction: (1) a glass crystallization method comprising the steps of mixing barium oxide, iron oxide, metallic oxide which substitutes iron, and boron oxide as a glass-forming material so as to make a desired ferrite composition, melting and then quenching the ferrite composition to obtain an amorphous product, treating by reheating, washing and pulverizing the amorphous product, to thereby obtain barium ferrite crystal powder; (2) a hydrothermal reaction method comprising the steps of neutralizing a barium ferrite composition metallic salt solution with an alkali, removing the byproducts produced, heating the liquid phase at 100° C. or more, washing, drying and then pulverizing, to thereby obtain barium ferrite crystal powder; and (3) a coprecipitation method comprising the steps of neutralizing a barium ferrite composition metallic salt solution with an alkali, removing the byproducts produced and drying, treating the system at 1,100° C. or less, and then pulverizing to obtain barium ferrite crystal powder.

Thickness and Coercive Force (Hc) of Magnetic Layer:

A magnetic layer is formed by coating, on a support, a magnetic coating solution prepared by kneading and dispersing the above resin compositions, a hardening agent and ferromagnetic powder with a solvent generally used in preparing a magnetic coating solution, e.g., methyl ethyl ketone, dioxane, cyclohexanone or ethyl acetate. Kneading and dispersing can be performed according to ordinary methods. In addition to the above components, a magnetic coating solution may contain generally-used additives and fillers, such as abrasives, e.g., alpha-Al$_2$O$_3$ and Cr$_2$O$_3$, antistatic agents, e.g., carbon black, lubricants, e.g., fatty acid, fatty acid ester and silicone oil, and dispersants.

The thickness of a magnetic layer in the present invention is preferably from 0.01 to 0.15 μm, and more preferably from 0.05 to 0.13 μm.

When the thickness of a magnetic layer is 0.15 μm or less, a PW50 value (the half value width of pulse) can be optimized, and a stable error rate can be obtained at high density recording.

In the present invention, the coercive force (Hc) in the machine direction or in-plane direction of a magnetic layer is preferably from 159 to 318 kA/m (from 2,000 to 4,000 Oe) for the purpose of decreasing self-demagnetization loss and achieving high density recording. When the coercive force (Hc) is 159 kA/m or more, good high density recording can be achieved. On the other hand, the higher the coercive force (Hc), the higher can be obtained the S/N ratio at high density recording, but too high a coercive force (Hc) results in the reduction of erasure ratio. Accordingly, it is preferred in the present invention to restrict the upper limit of Hc in the machine direction or in-plane direction of a magnetic layer to 318 kA/m. However, erasure capacity heightens with the improvement of the characteristics of the magnetic head and the upper limit tends to increase. The coercive force (Hc) at present time is more preferably from 159 to 279 kA/m (from 2,000 to 3,500 Oe), and particularly preferably from 159 to 200 kA/m (from 2,000 to 2,500 Oe).

In the specification of the present invention, "the machine direction of a magnetic layer" is the direction which is coincident with the running direction of a tape-like magnetic recording medium, i.e., the direction perpendicular to the transverse direction. Further, in the specification of the present invention, "the in-plane direction of a magnetic layer" is used in contradistinction to the perpendicular direction to the magnetic layer surface in a disc-like magnetic recording medium (i.e., the perpendicular direction), and it means the direction parallel to a magnetic layer.

For realizing the above coercive force (Hc) in the machine direction or in-plane direction of a magnetic layer, it is preferred in the present invention to use, e.g., ferromagnetic fine powder having an average long axis length or an average tabular diameter of 60 nm or less, saturation magnetization ($\sigma_s$) of from 110 to 155 A·m$^2$/kg, and coercive force (Hc) of 159 kA/m or more.

In the next place, the additives which can be added to a magnetic layer together with the above-described binders and magnetic powders are described below.

Carbon Black:

The examples of carbon blacks which are used in the magnetic layer of the present invention include furnace blacks for rubbers, thermal blacks for rubbers, carbon blacks for coloring and acetylene blacks. They preferably have a specific surface area ($S_{BET}$) of from 5 to 500 m$^2$/g, an oil absorption amount using DBP (dibutyl phthalate) of from 10 to 400 ml/100 g, an average particle size of from 5 to 300 nm, pH of from 2 to 10, a water content of from 0.1 to 10%, and a tap density of from 0.1 to 1 g/ml. The specific examples of carbon blacks are disclosed in WO 98/35345.

Carbon blacks can serve various functions such as the prevention of the static charge and reduction of the friction coefficient of a magnetic layer, the provision of a lightshielding property to a magnetic layer, and the improvement of the film strength of a magnetic layer. Such functions vary depending upon the kind of the carbon black to be used. Accordingly, when the present invention takes a multilayer structure, it is of course possible to select and determine the kinds, the amounts and the combinations of the carbon blacks to be added to each layer on the basis of the above-described various properties such as the particle size, the oil absorption amount, the electroconductivity and the pH value, or these should be rather optimized in respective layers.

Abrasive:

Abrasives can be contained in a magnetic layer in the present invention. As the abrasives usable in the present invention, well-known materials essentially having a Mohs' hardness of 6 or more may be used alone or in combination, e.g., alpha-alumina having an alpha-conversion rate of 90% or more, beta-alumina, silicon carbide, chromium oxide, cerium oxide, alpha-iron oxide, corundum, artificial diamond, silicon nitride, silicon carbide, titanium carbide, titanium oxide, silicon dioxide, and boron nitride. The composites composed of these abrasives (abrasives obtained by surface-treating with other abrasives) may also be used.

Compounds or elements other than the main component are often contained in abrasives in the present invention, but the intended effect can be attained so long as the content of the main component is 90% or more. It is preferred that these abrasives have an average particle size of from 0.01 to 2 $\mu$m, and particularly for improving electromagnetic characteristics (an S/N ratio), abrasives having narrow particle size distribution are preferred. For the purpose of improving durability, a plurality of abrasives each having a different particle size may be combined according to necessity, or a single abrasive having a broad particle size distribution may be used so as to attain the same effect as such a combination.

Abrasives preferably have a tap density of from 0.3 to 2 g/ml, a water content of from 0.1 to 5%, a pH value of from 2 to 11, and a specific surface area ($S_{BET}$) of from 1 to 30 m$^2$/g. The figure of the abrasives for use in the present invention may be any of acicular, spherical and die-like figures. Abrasives having a figure partly with edges are preferred for their high abrasive property. The specific examples of abrasives for use in the present invention are disclosed in WO 98/35345, above all, using diamonds as disclosed in the above patent is effective for improving running durability and electromagnetic characteristics. The particle sizes and the addition amounts of abrasives to be added to a magnetic layer and a nonmagnetic layer should be selected at optimal values.

Other Additives:

As other additives which can be added to a magnetic layer in the present invention, those having a lubricating effect, an antistatic effect, a dispersing effect and a plasticizing effect are exemplified, and comprehensive improvement of performances can be contrived by combining these additives. As additives having a lubricating effect, lubricants giving remarkable action on agglutination caused by the friction of surfaces of materials with each other are used. Lubricants are classified into two types. Lubricants which are used for a magnetic recording medium cannot be judged completely whether they show fluid lubrication or boundary lubrication, but according to general concepts they are classified into higher fatty acid esters, liquid paraffins and silicon derivatives which show fluid lubrication, and long chain fatty acids, fluorine surfactants and fluorine-containing polymers which show boundary lubrication. In a coating type magnetic recording medium, lubricants exist in a state dispersed in a binder or in a state partly adsorbed onto the surface of ferromagnetic powder, and they migrate to the surface of a magnetic layer. The speed of migration depends upon whether the compatibility of the binder and the lubricant is good or bad. The speed of migration is slow when the compatibility of the binder and the lubricant is good and the migration speed is fast when the compatibility is bad. As one idea as to good or bad of the compatibility, there is a means of comparison of dissolution parameters of the binder and the lubricant. A nonpolar lubricant is effective for fluid lubrication and a polar lubricant is effective for boundary lubrication.

In the present invention, it is preferred to use a higher fatty acid ester showing fluid lubrication and a long chain fatty acid showing boundary lubrication each having different characteristics in combination, and it is more preferred to combine at least three of these lubricants. Solid lubricants can also be used in combination with them.

The examples of solid lubricants which can be used in the present invention include molybdenum disulfide, tungsten graphite disulfide, boron nitride, and graphite fluoride. The examples of long chain fatty acids showing boundary lubrication include monobasic fatty acids having from 10 to 24 carbon atoms (which may contain an unsaturated bond or may be branched) and metal salts of these monobasic fatty acids (e.g., with Li, Na, K or Cu). The examples of fluorine surfactants and fluorine-containing polymers include fluorine-containing silicones, fluorine-containing alcohols, fluorine-containing esters, fluorine-containing alkyl sulfuric esters and alkali metal salts of them. The examples of higher fatty acid esters showing fluid lubrication include basic fatty acid monoesters, fatty acid diestesr or fatty acid triesters comprising a monobasic fatty acid having from 10 to 24 carbon atoms (which may contain an unsaturated bond or may be branched) and any one of mono-, di-, tri-, tetra-, penta-and hexa-alcohols having from 2 to 12 carbon atoms (which may contain an unsaturated bond or may be branched), and fatty acid esters of monoalkyl ethers of alkylene oxide polymers. In addition to the above, the examples further include liquid paraffins, and as the silicone derivatives, silicone oils, e.g., dialkylpolysiloxane (wherein the alkyl group has from 1 to 5 carbon atoms), dialkoxypolysiloxane (wherein the alkoxy group has from 1 to 4 carbon atoms), monoalkylmonoalkoxypolysiloxane (wherein the alkyl group has from 1 to 5 carbon atoms and the alkoxy group has from 1 to 4 carbon atoms), phenylpolysiloxane and fluoroalkylpolysiloxane (wherein the alkyl group has from 1 to 5 carbon atoms), silicones having a polar group, fatty acid-modified silicones, and fluorine-containing silicones.

The examples of other lubricants which can be used in the present invention include alcohols such as mono-, di-, tri-, tetra-, penta- or hexa-alcohols having from 12 to 22 carbon atoms (which may contain an unsaturated bond or may be branched), alkoxy alcohols having from 12 to 22 carbon atoms (which may contain an unsaturated bond or may be branched), and fluorine-containing alcohols, polyethylene waxes, polyolefins such as polypropylenes, ethylene glycols, polyglycols such as polyethylene oxide waxes, alkyl phosphoric esters and alkali metal salts of alkyl phosphoric esters, alkyl sulfuric esters and alkali metal salts of alkyl sulfuric esters, polyphenyl ethers, fatty acid amides having from 8 to 22 carbon atoms, and aliphatic amines having from 8 to 22 carbon atoms.

The examples of additives having an antistatic effect, a dispersing effect and a plasticizing effect which can be used in the present invention include phenylphosphonic acids, specifically "PPA" (manufactured by Nissan Chemical Industries, Ltd.), alpha-naphthylphosphoric acids, phenylphosphoric acids, diphenylphosphoric acids, p-ethylbenzenephosphonic acids, phenylphosphinic acids, aminoquinones, various kinds of silane coupling agents, titanium coupling agents, fluorine-containing alkyl sulfuric esters and alkali metal salts thereof.

The lubricants particularly preferably used in the present invention are fatty acids and fatty acid esters, and the specific examples of the lubricants are disclosed in WO 98/35345. Besides the above, other different lubricants and additives can be used in combination as well.

Additionally, nonionic surfactants, e.g., alkylene oxides, glycerols, glycidols and alkylphenol-ethylene oxide addition products; cationic surfactants, e.g., cyclic amines, ester amides, quaternary ammonium salts, hydantoin derivatives, heterocyclic rings, phosphoniums and sulfoniums; anionic surfactants containing an acidic group, e.g., a carboxylic acid, a sulfonic acid, a phosphoric acid, a sulfuric ester group or a phosphoric ester group; and amphoteric surfactants, e.g., amino acids, aminosulfonic acids, sulfuric esters or phosphoric esters of amino alcohols, and alkylbetains can also be used.

The details of these surfactants are described in *Kaimen Kasseizai Binran* (*Handbook of Surfactants*) (published by Sangyo Tosho Co., Ltd.). These lubricants and antistatic agents need not be 100% pure and may contain impurities such as isomers, unreacted products, byproducts, decomposed products and oxides, in addition to the main components. However, the content of such impurities is preferably 30% or less, and more preferably 10% or less.

It is also preferred to use a monoester and a diester in combination as fatty acid esters as described in WO 98/35345.

The amount of the lubricants contained a magnetic layer according to the present invention is from 5 to 30 mass parts per 100 mass parts of the ferromagnetic powder.

The lubricants and surfactants which are used in the present invention respectively have different physical functions. The kind, amount and proportion of generating synergistic effects of the lubricants should be determined optimally in accordance with the purpose. A nonmagnetic layer and a magnetic layer can separately contain different fatty acids each having a different melting point so as to prevent bleeding out of the fatty acids to the surface, or different esters each having a different boiling point, a different melting point and a different polarity so as to prevent bleeding out of the esters to the surface. Further, it is also effective to adjust the amount of the surfactant so as to improve the coating stability, or to make the amount of the lubricant in a nonmagnetic layer larger so as to improve the lubricating effect. Examples are by no means limited thereto. The total amount of the lubricants is generally from 0.1 to 50 mass parts per 100 mass parts of the magnetic powder or the nonmagnetic powder, and preferably from 2 to 25 mass parts.

All or a part of the additives to be used in the present invention may be added to a magnetic coating solution or a nonmagnetic coating solution in any step of preparation. For example, the additives may be blended with magnetic powder before a kneading step, may be added in the step of kneading magnetic powder, a binder and a solvent, may be added in a dispersing step, may be added after dispersion, or may be added just before coating. According to the purpose, there is a case of capable of attaining the object by coating all or a part of the additives simultaneously with or successively after the coating of a magnetic layer. According to the purpose, the lubricants may be coated on the surface of a magnetic layer after calendering treatment or after the completion of slitting.

Nonmagnetic Layer:

The magnetic recording medium in the invention can have a nonmagnetic layer as the lower layer of the above-described magnetic layer. The nonmagnetic layer is described in detail below.

The nonmagnetic layer in the invention exhibits its effect so long as it is substantially nonmagnetic, and even if, or intentionally, a small amount of magnetic powder is contained as the impurity, it reveals the effect of the present invention, and as a matter of course the nonmagnetic layer can be regarded as essentially the same construction as in the present invention.

The term "substantially nonmagnetic" means that the residual magnetic flux density of the nonmagnetic layer is 10 mT or less or the coercive force (Hc) is 8 kA/m (100 Oe) or less, preferably the residual magnetic flux density and the coercive force are zero. When the nonmagnetic layer contains magnetic powder, the content of the magnetic powder is preferably less than ½ of the entire inorganic powders in the nonmagnetic layer. Further, a soft magnetic layer comprising soft magnetic powder and a binder may be formed as the lower layer in place of the nonmagnetic layer. The thickness of the soft magnetic layer is the same as the case of the nonmagnetic layer.

The nonmagnetic layer in the present invention preferably comprises a nonmagnetic inorganic powder and a binder as main components. The nonmagnetic inorganic powders used in the nonmagnetic layer can be selected from inorganic compounds, e.g., metallic oxide, metallic carbonate, metallic sulfate, metallic nitride, metallic carbide and metallic sulfide. The inorganic compounds are selected from the following compounds and they can be used alone or in combination, e.g., alpha-alumina having an alpha-conversion rate of 90% or more, beta-alumina, gamma-alumina, theta-alumina, silicon carbide, chromium oxide, cerium oxide, alpha-iron oxide, hematite, goethite, corundum, silicon nitride, titanium carbide, titanium oxide, silicon dioxide, tin oxide, magnesium oxide, tungsten oxide, zirconium oxide, boron nitride, zinc oxide, calcium carbonate, calcium sulfate, barium sulfate and molybdenum disulfide. Of these compounds, titanium dioxide, zinc oxide, alpha-iron oxide and barium sulfate are particularly preferred for the reasons that they have narrow particle size distribution and a variety of means for imparting functions, and titanium dioxide and alpha-iron oxide are more preferred.

The nonmagnetic inorganic powders preferably have an average particle size of from 5 to 200 nm. If necessary, a plurality of nonmagnetic inorganic powders each having a different average particle size may be combined, or single nonmagnetic inorganic powder having a broad particle size distribution may be used so as to attain the same effect as such a combination. The particularly preferred average particle size of the nonmagnetic inorganic powder is from 10 to 200 nm. In particular, when the nonmagnetic inorganic powders are granular metallic oxides, the average particle size is preferably 80 nm or less, and when the nonmagnetic inorganic powders are acicular metallic oxides, the average long axis length is preferably 300 nm or less, and more preferably 200 nm or less.

The nonmagnetic inorganic powders have a tap density of generally from 0.05 to 2 g/ml, and preferably from 0.2 to 1.5 g/ml; a water content of generally from 0.1 to 5 mass %, preferably from 0.2 to 3 mass %, and more preferably from 0.3 to 1.5 mass %; a pH value of generally from 2 to 11, and particularly preferably from 5.5 and 10; a specific surface area ($S_{BET}$) of generally from 1 to 100 m$^2$/g, preferably from 5 to 80 m$^2$/g, and more preferably from 10 to 70 m$^2$/g; a crystallite size of preferably from 0.004 to 1 μm, and more preferably from 0.04 to 0.1 μm; a DBP oil absorption amount of generally from 5 to 100 ml/100 g, preferably from 10 to 80 ml/100 g, and more preferably from 20 to 60 ml/100 g; and a specific gravity of generally from 1 to 12, and preferably from 3 to 6. The nonmagnetic inorganic powders may have any figure, e.g., acicular, spherical, polyhedral and tabular figures. The nonmagnetic inorganic powders preferably have a Mohs' hardness of from 4 to 10. The SA (stearic acid) adsorption amount of the nonmagnetic inorganic powders is generally from 1 to 20 μmol/m$^2$, preferably from 2 to 15 μmol/m$^2$, and more preferably from 3 to 8 μmol/m$^2$.

The surfaces of these nonmagnetic inorganic powders are preferably covered with $Al_2O_3$, $SiO_2$, $TiO_2$, $ZrO_2$, $SnO_2$, $Sb_2O_3$, $ZnO$ or $Y_2O_3$. $Al_2O_3$, $SiO_2$, $TiO_2$ and $ZrO_2$ are particularly preferred in the point of dispersibility, and $Al_2O_3$, $SiO_2$ and $ZrO_2$ are more preferred. These surface-covering agents may be used in combination or may be used alone. A surface-treated layer subjected to coprecipitation treatment may be used according to the purpose, alternatively, surface treatment of particles may be previously performed to be covered with alumina in the first place, and then the alumina-covered surface may be covered with silica, or vice versa. Further, a surface-covered layer may be porous, if necessary, but a homogeneous and dense surface is generally preferred.

The specific examples of the nonmagnetic inorganic powders which are used in the lower layer and the manufacturing method of the nonmagnetic inorganic powders are disclosed in WO 98/35345.

Organic powders can be used in the nonmagnetic layer of the invention according to the purpose, e.g., acrylic styrene resin powders, benzoguanamine resin powders, melamine resin powders, and phthalocyanine pigments can be used. In addition, polyolefin resin powders, polyester resin powders, polyamide resin powders, polyimide resin powders and polyethylene fluoride resin powders can also be used. The producing methods of these powders are disclosed in JP-A-62-18564 and JP-A-60-255827.

The binders, lubricants, dispersants, additives, solvents, dispersing methods, addition amounts and the like used in the magnetic layer shown above can be applied to the nonmagnetic layer and the backing layer described later. In particular, with respect to the amounts and the kinds of the binders, and the addition amounts and the kinds of the additives and the dispersants, well-known techniques regarding magnetic layers can be applied to the nonmagnetic layer in the present invention.

Support:

A support for use in the present invention is preferably a nonmagnetic flexible support, and essentially has a thermal shrinkage factor at 100° C. for 30 minutes of 0.5% or less in every direction of in-plane of the support, and a thermal shrinkage factor at 80° C. for 30 minutes of 0.5% or less, and more preferably 0.2% or less. Moreover, the above thermal shrinkage factors of the support at 100° C. for 30 minutes and at 80° C. for 30 minutes are preferably almost equal in every direction of in-plane of the support with difference of not more than 10%. The support is preferably a nonmagnetic support.

As the support for use in the present invention, well-known films, such as polyesters (e.g., polyethylene terephthalate and polyethylene naphthalate), polyolefins, cellulose triacetate, polycarbonate, aromatic or aliphatic polyamide, polyimide, polyamideimide, polysulfone, polyaramid, and polybenzoxazole can be used. Supports having high strength such as polyethylene naphthalate and polyamide are especially preferably used. If necessary, a lamination type support as disclosed in JP-A-3-224127 can be used to control the surface roughnesses of a magnetic surface and a base surface (a back surface) respectively. These supports may be previously subjected to surface treatments, such as corona discharge treatment, plasma treatment, adhesion assisting treatment, heat treatment, and dust-removing treatment. Aluminum or glass substrate can also be used as a support in the present invention.

It is preferred in the present invention to use supports having a central plane average surface roughness (Ra) of 4.0 nm or less measured by model HD-2000 (a product of WYKO Co.), Ra is more preferably 2.0 nm or less. It is preferred that these supports not only have a small central plane average surface roughness but also are free from coarse projections having a height of 0.5 μm or more. Surface roughness configuration is freely controlled by the size and the amount of the fillers added to the support. The examples of fillers include acryl-based organic powders, as well as oxides or carbonates of Ca, Si and Ti. Supports for use in the present invention preferably have a maximum height (Rmax) of 1 μm or less, a ten point average roughness (Rz) of 0.5 μm or less, a central plane peak height (Rp) of 0.5 μm or less, a central plane valley depth (Rv) of 0.5 μm or less, a central plane area factor (Sr) of from 10% to 90%, and an average wavelength (λa) of from 5 to 300 μm. The projection distribution on the surface of a support can be controlled arbitrarily by adding fillers to a support for the purpose of obtaining desired electromagnetic characteristics and durability. It is possible to add from 0 to 2,000 fillers having sizes of from 0.01 to 1 μm per 0.1 mm$^2$, and surface projection distribution can be controlled in this range.

The F-5 value of a support for use in the present invention is preferably from 49 to 490 MPa (from 5 to 50 kg/mm$^2$), the thermal shrinkage factor of a support at 100° C. for 30 minutes is preferably 3% or less, more preferably 1.5% or less, and the thermal shrinkage factor at 80° C. for 30 minutes is preferably 1% or less, more preferably 0.5% or less. A support for use in the invention has a breaking strength of from 49 to 980 MPa (from 5 to 100 kg/mm$^2$), an elastic modulus of from 980 to 19,600 MPa (from 100 to 2,000 kg/mm$^2$), a temperature expansion coefficient of from $10^{-4}$ to $10^{-8}$/° C., preferably from $10^{-5}$ to $10^{-6}$/° C., and a humidity expansion coefficient of $10^{-4}$/RH % or less, preferably $10^{-5}$/RH % or less. The thermal characteristics, dimensional characteristics and mechanical strength characteristics are preferably almost equal in every direction of in-plane of a support with difference of not more than 10%.

Backing Layer:

In a magnetic recording medium in the invention, a backing layer may be formed on the side of a support opposite to the side having a magnetic layer. A backing layer can be formed on a magnetic disc as well. In general, a magnetic tape for a computer data recording is decidedly required to have an excellent repeating-running property as compared with the video tape and the audio tape. For maintaining such a high running durability, it is preferred for a backing layer to contain a carbon black and inorganic powder.

Two kinds of carbon blacks respectively having different average particle sizes are preferably used in combination in a backing layer. In general, by the addition of a fine carbon black as above, the surface electrical resistance of a backing layer and light transmittance can be set up at low values respectively. Since there are many kinds of magnetic recording apparatus making use of light transmittance of a tape to make it as a signal of operation, the addition of fine carbon blacks is particularly effective in such a case. In addition, a fine carbon black is in general excellent in retention of a liquid lubricant and contributes to the reduction of a friction coefficient when a lubricant is used in combination. On the other hand, a coarse carbon black having an average particle size of from 230 to 300 nm has a function as a solid lubricant and forms minute projections on the surface of a backing layer to thereby reduce the contact area and contributes to the reduction of a friction coefficient.

The specific examples of commercially available fine carbon blacks and coarse carbon blacks which are used in a backing layer in the present invention are disclosed in WO 98/35345.

When two kinds of carbon blacks respectively having different average particle sizes are used in combination in a backing layer, the proportion of the contents (by mass) of a fine carbon black having a particle size of from 10 to 20 nm and a coarse carbon black having a particle size of from 230 to 300 nm is preferably the former/the latter of from 98/2 to 75/25, and more preferably from 95/5 to 85/15.

The content of a carbon black in a backing layer (the total amount when two kinds of carbon blacks are used) is generally from 30 to 80 mass parts based on 100 mass parts of the binder, and preferably from 45 to 65 mass parts.

It is preferred to use two kinds of inorganic powders respectively having different hardness in a backing layer. Specifically, soft inorganic powder having a Mohs' hardness of from 3 to 4.5 and hard inorganic powder having a Mohs' hardness of from 5 to 9 are preferably used in combination. By adding soft inorganic powder having a Mohs' hardness of from 3 to 4.5, a friction coefficient can be stabilized against repeating-running. Moreover, a sliding guide pole is not scratched off due to hardness in this range. The average particle size of the soft inorganic powder is preferably from 30 to 50 nm.

The examples of soft inorganic powders having a Mohs' hardness of from 3 to 4.5 include, e.g., calcium sulfate, calcium carbonate, calcium silicate, barium sulfate, magnesium carbonate, zinc carbonate and zinc oxide. These soft inorganic powders can be used alone or in combination of two or more.

The content of the soft inorganic powder in a backing layer is preferably from 10 to 140 mass parts based on 100 mass parts of the carbon black, and more preferably from 35 to 100 mass parts.

By the addition of hard inorganic powder having a Mohs' hardness of from 5 to 9, the strength of the backing layer increases and running durability is improved. When such hard inorganic powders are used together with carbon blacks and the soft inorganic powders, deterioration due to repeating sliding is reduced and a strong backing layer can be obtained. An appropriate abrasive property is provided to a backing layer by the addition of the hard inorganic powder and the adhesion of scratched powders to a tape guide pole is reduced.

In particular, when hard inorganic powder is used in combination with soft inorganic powder, sliding characteristics against a guide pole having a rough surface is improved and the stabilization of a friction coefficient of the backing layer can also be brought about.

The average particle size of hard inorganic powders is preferably from 80 to 250 nm, and more preferably from 100 to 210 nm.

The examples of hard inorganic powders having a Mohs' hardness of from 5 to 9 include, e.g., alpha-iron oxide, alpha-alumina, and chromium oxide ($Cr_2O_3$). These powders may be used alone or in combination. Of the above hard inorganic powders, alpha-iron oxide and alpha-alumina are preferred. The content of hard inorganic powders in a backing layer is generally from 3 to 30 mass parts based on 100 mass parts of the carbon black, and preferably from 3 to 20 mass parts.

When the above soft inorganic powder and hard inorganic powder are used in combination in a backing layer, it is preferred to use them selectively such that the difference of hardness between soft and hard inorganic powders is 2 or more, more preferably 2.5 or more, and particularly preferably 3 or more.

It is preferred that the above two kinds of inorganic powders respectively having different hardness and specific average particle sizes and the above two kinds of carbon blacks respectively having different average particle sizes be contained in a backing layer.

Lubricants may be contained in a backing layer. The lubricants can be arbitrarily selected from among those which can be used in a magnetic layer or a nonmagnetic layer as described above. The content of a lubricant added to a backing layer is generally from 1 to 5 mass parts based on 100 mass parts of the binder.

Subbing Layer:

In the magnetic recording medium of the present invention, a subbing layer may be formed between a support and a magnetic layer or a nonmagnetic layer, if necessary. Adhesion between a support and a magnetic layer or a nonmagnetic layer can be improved by providing a subbing layer. Polyester resins soluble in a solvent are used as a subbing layer.

Layer Constitution

The support thickness of a magnetic recording medium in the present invention is generally from 2 to 100 μm, and preferably from 2 to 80 μm. The support thickness of a computer tape is from 3.0 to 6.5 μm, preferably from 3.0 to 6.0 μm, and more preferably from 4.0 to 5.5 μm.

The thickness of a subbing layer is from 0.1 to 1.0 μm, and preferably from 0.1 to 0.7 μm. When a backing layer is provided, the thickness of the backing layer is from 0.2 to 1.0 μm, and preferably from 0.3 to 0.7 μm.

The thicknesses of a nonmagnetic layer and a magnetic layer of a magnetic recording medium in the present invention are optimized according to the saturation magnetization amount and the head gap length of the head to be used, and the recording signal zone. The thickness of a magnetic layer in the present invention is preferably from 0.01 to 0.15 μm as described above, and the thickness of a nonmagnetic layer is generally from 0.5 to 3.0 μm, preferably from 1 to 2.5 μm, and more preferably from 1.3 to 1.7 μm.

When a magnetic recording medium in the present invention comprises two magnetic layers, a nonmagnetic layer and a soft magnetic layer may be or may not be formed. For example, the thickness of the magnetic layer farther from the support can be from 0.01 to 0.1 μm, preferably from 0.01 to 0.05 μm, and the thickness of the magnetic layer nearer from the support can be from 0.05 to 0.15 μm. When a magnetic layer comprises a single layer, the thickness of the magnetic layer is 0.2 µm or less as described above.

Manufacturing Method:

Processes of preparing a magnetic layer coating solution for use in a magnetic recording medium in the present invention comprise at least a kneading step, a dispersing step and blending steps to be carried out optionally before and/or after the kneading and dispersing steps. Each of these steps may be composed of two or more separate stages. Materials such as magnetic powder, nonmagnetic powder, a radiation-curable resin, a binder, a carbon black, an abrasive, an antistatic agent, a lubricant and a solvent for use in a magnetic recording medium in the present invention may be added in any step at any time, and each material may be added in two or more steps separately. For instance, polyurethane can be added in parts in a kneading step, a dispersing step, or a blending step for adjusting viscosity after dispersion.

For achieving the object of the present invention, the above steps can be performed partly with conventionally well-known producing techniques. It is preferred to use powerful kneading machines such as an open kneader, a continuous kneader, a pressure kneader or an extruder in a kneading step. When a kneader is used, magnetic powder or nonmagnetic powder and all or a part of a binder (preferably 30% or more of the total binders) are kneading-treated in the range of from 15 to 500 mass parts per 100 mass parts of the magnetic powder. Details of kneading treatment are disclosed in JP-A-1-106338 and JP-A-1-79274. When a magnetic layer coating solution and a nonmagnetic layer coating solution are dispersed, glass beads can be used, but dispersing media having a high specific gravity, e.g., zirconia beads, titania beads and steel beads, are preferably used. Optimal particle size and packing density of these dispersing media should be selected. Well-known dispersing apparatus can be used in the invention.

A nonmagnetic layer coating solution and a magnetic layer coating solution may be coated successively or may be multilayer-coated at the same time. When a magnetic layer comprises two layers, the upper magnetic layer and the lower magnetic layer may be coated successively or may be multilayer-coated simultaneously. It is preferred that a nonmagnetic layer and a magnetic layer be formed by a wet-on-dry coating method. That is, a method of coating a nonmagnetic layer coating solution containing nonmagnetic powder and a binder on a support and drying the coated solution to form a nonmagnetic layer, and then coating a magnetic layer coating solution containing magnetic powder and a binder on the nonmagnetic layer and drying the coated solution to form a magnetic layer is preferred.

Air doctor coating, blade coating, rod coating, extrusion coating, air knife coating, squeeze coating, impregnation coating, reverse roll coating, transfer roll coating, gravure coating, kiss coating, cast coating, spray coating and spin coating can be used for coating the above magnetic layer coating solution or nonmagnetic layer coating solution. These methods are described, e.g., in *Saishin Coating Gijutsu* (*The Latest Coating Techniques*), Sogo Gijutsu Center Co. (May 31, 1983).

The following methods are preferably used in the present invention for coating a multilayer magnetic recording medium.

(1) A method of coating a lower layer in the first place by using any of gravure coating, roll coating, blade coating, and extrusion coating apparatus, which are ordinarily used in the coating of a magnetic coating solution, and then coating an upper layer while the lower layer is still wet by means of a support-pressing type extrusion coating apparatus as disclosed in JP-B-1-46186 (the term "JP-B" as used herein means an "examined Japanese patent publication"), JP-A-60-238179 and JP-A-2-265672.

(2) A method of coating an upper layer and a lower layer almost simultaneously by using a coating head equipped with two slits for feeding coating solution as disclosed in JP-A-63-88080, JP-A-2-17971 and JP-A-2-265672.

(3) A method of coating an upper layer and a lower layer almost simultaneously by using an extrusion coating apparatus equipped with a backup roll as disclosed in JP-A-2-174965.

For preventing the deterioration of electromagnetic characteristics of a magnetic recording medium due to agglomeration of magnetic particles, it is preferred to give shear to the coating solution in a coating head by a method as disclosed in JP-A-62-95174 and JP-A-1-236968. With respect to the viscosity of a coating solution, the range of the numeric values disclosed in JP-A-3-8471 is necessary to be satisfied.

In the case of a disc-like magnetic recording medium, isotropic orientation can be sufficiently obtained in some cases without carrying out orientation by orientation apparatus, but it is preferred to use well-known random orientation apparatus, e.g., disposing cobalt magnets diagonally and alternately or applying an alternating current magnetic field with a solenoid. Hexagonal ferrites generally have an inclination for three dimensional random orientation of in-plane and in the perpendicular direction but it can be made in-plane two dimensional random orientation. Further, it is also possible to provide isotropic magnetic characteristics in the circumferential direction by perpendicular orientation by using well-known methods, e.g., by using different pole and counter position magnets. In particular, perpendicular orientation is preferred in the case of high density recording. Circumferential orientation may be performed by using spin coating.

In the case of a tape-like magnetic recording medium, orientation is performed in the machine direction using a cobalt magnet and a solenoid. It is preferred that the drying position of a coated film can be controlled by controlling the temperature and the amount of drying air and coating velocity. Coating velocity is preferably from 20 to 1,000 m/min. and the temperature of drying air is preferably 60° C. or more. Appropriate preliminary drying can also be performed before entering a magnet zone.

Heat resisting plastic rollers such as epoxy, polyimide, polyamide and polyimideamide rollers, or metal rollers are used for calendering treatment. Metal rollers are preferably used for the treatment particularly when magnetic layers are coated on both surface sides of a support. Temperature for treatment is preferably 50° C. or more, and more preferably 100° C. or more. Linear pressure is preferably 196 kN/m (200 kg/cm) or more, and more preferably 294 kN/m (300 kg/cm) or more.

Physical Properties:

In the case of a disc-like magnetic recording medium, the squareness ratio is generally from 0.55 to 0.67 in the case of two dimensional random orientation, preferably from 0.58 to 0.64, and the squareness ratio in the case of three dimensional random orientation is preferably from 0.45 to 0.55.

In the case of perpendicular orientation, the squareness ratio is generally 0.6 or more and preferably 0.7 or more in the perpendicular direction, and when diamagnetic field correction is performed, the squareness ratio is generally 0.7 or more, and preferably 0.8 or more. The orientation ratio of two dimensional random orientation and three dimensional random orientation is preferably 0.8 or more. In the case of two dimensional random orientation, the squareness ratio, Br and Hc in the perpendicular direction are preferably from 0.1 to 0.5 times of those in the in-plane direction. In the case of a tape-like magnetic recording medium, the squareness ratio is 0.7 or more, and preferably 0.8 or more.

The friction coefficient of the magnetic recording medium of the present invention against a head in the range of the temperature of −10 to 40° C. and the humidity of 0 to 95% is generally 0.5 or less, and preferably 0.3 or less. The surface inherent resistivity of the magnetic surface is preferably from $10^4$ to $10^{12}$ ohm/sq, and the charge potential is preferably from −500 to +500 V. The elastic modulus at 0.5% elongation of the magnetic layer is preferably from 980 to 19,600 MPa (from 100 to 2,000 kg/mm$^2$) in every direction of in-plane, the breaking strength is preferably from 98 to 686 MPa (from 10 to 70 kg/mm$^2$), the elastic modulus of the magnetic recording medium is preferably from 980 to 14,700 MPa (from 100 to 1,500 kg/mm$^2$) in every direction of in-plane, the residual elongation is preferably 0.5% or less, and the thermal shrinkage factor at every temperature of 100° C. or less is preferably 1% or less, more preferably 0.5% or less, and most preferably 0.1% or less.

The glass transition temperature of the magnetic layer (the maximum of loss elastic modulus of dynamic visco-elasticity measurement measured at 110 Hz) is preferably from 80 to 120° C., and that of the nonmagnetic layer is also preferably from 80 to 120° C. The loss elastic modulus is preferably in the range of from $1\times10^5$ to $8\times10^8$ Pa, and loss tangent is preferably 0.2 or less. When the loss tangent is too great, adhesion failure is liable to occur. These thermal and mechanical characteristics are preferably almost equal in every direction of in-plane of the medium with the difference of not more than 10%. The residual amount of the solvent in the magnetic layer is preferably 100 mg/m$^2$ or less, and more preferably 10 mg/m$^2$ or less. The void ratio of the coated layer is preferably 30% by volume or less with both of the nonmagnetic layer and the magnetic layer, and more preferably 20% by volume or less. The void ratio is preferably smaller for obtaining high output, but in some cases it is preferred to secure a specific value depending upon purposes. For example, in a disc-like medium which is repeatedly used, large void ratio contributes to good running durability in many cases.

It is preferred for the magnetic layer to have from 5 to 1,000 surface projections of the sizes of from 10 to 20 nm per 100 μm2. The surface projections can be easily controlled by the control of the surface property of the support by fillers, the particle size and the amount of the magnetic powder added to the magnetic layer, or by the surface configuration of the rollers of calender treatment. Curling is preferably within the range of plus or minus 3 mm. It is easily conceivable that these physical properties of the magnetic recording medium in the present invention can be varied according to purposes in the nonmagnetic layer and the magnetic layer. For example, the elastic modulus of the magnetic layer is made higher to improve running durability and at the same time the elastic modulus of the nonmagnetic layer is made lower than that of the magnetic layer to improve the head touching of the magnetic recording medium.

The needs for image-recording have increased more and more not only in the industrial fields but in general homes in the present multimedia society. The magnetic recording medium of the present invention has performance capable of sufficiently meeting the demands for the function and cost as the image-recording medium besides the data such as letters and figures.

The magnetic recording medium of the present invention can be preferably used for a magnetic recording and reproducing system using a magneto-resistance reproducing head (an MR head). The kind of the MR head is not particularly restricted, and a GMR head and a TMR head can also be used. A recording head is not particularly limited, but it is preferred that a recording head have saturation magnetization of 1.2 T or more, more preferably 2.0 T or more.

The magnetic recording medium of the present invention is preferably used for computer data recording.

EXAMPLES

The present invention will be described in detail below with reference to specific examples, but the present invention should not be construed as being limited thereto.

Example 1

| Coating solution composition for forming magnetic layer: | |
| --- | --- |
| Ferromagnetic metal powder A: | 100 parts |
| Composition: Fe/Co = 100/30 | |
| Average long axis length: 45 nm | |
| Coercive force (Hc): 197 kA/m (2,480 Oe) | |
| Specific surface area by BET method: 68 m$^2$/g | |
| Crystallite size: 13 nm (130 angstroms) | |
| Surface-covering compound: Al$_2$O$_3$, Y$_2$O$_3$ | |
| Average acicular ratio: 6 | |
| Saturation magnetization ($\sigma_s$): 120 A · m$^2$/kg | |
| Polyurethane resin A | 12 parts |
| DD/HBpA/DEIS/MDI = 5/24/1/32 (molar ratio) | |
| DD: Dimer diol | |
| HBpA: Hydrogenated bisphenol A | |
| DEIS: Sulfoisophthalic acid-ethylene | |
| oxide addition product | |
| MDI: Diphenylmethane diisocyanate | |
| alpha-Alumina | 5 parts |
| Average particle size: 0.1 μm | |
| HIT60 (manufactured by Sumitomo Chemical | |
| Co., Ltd.) | |
| Carbon black | 0.5 parts |
| Average particle size: 0.08 μm | |
| Butyl stearate | 1 part |
| Stearic acid | 5 parts |
| Methyl ethyl ketone | 90 parts |
| Cyclohexanone | 30 parts |
| Toluene | 60 parts |
| Coating solution composition for forming nonmagnetic layer: | |
| Nonmagnetic powder, alpha-Fe$_2$O$_3$, hematite | 80 parts |
| Average long axis length: 0.15 μm | |
| Specific surface area by BET method: 52 m$^2$/g | |
| pH: 8 | |
| Tap density: 0.8 g/ml | |
| DBP oil absorption amount: 80 ml/100 g | |
| Surface-covering compound: Al$_2$O$_3$, Y$_2$O$_3$ | |
| Carbon black | 20 parts |
| Average primary particle size: 16 nm | |
| DBP oil absorption amount: 80 ml/100 g | |
| pH: 8 | |
| Specific surface area by BET method: 250 m$^2$/g | |
| Volatile content: 1.5% | |
| Vinyl chloride copolymer | 12 parts |
| MR-104 (manufactured by Nippon Zeon | |
| Co., Ltd.) | |
| Polyurethane resin A | 5 parts |
| Polyisocyanate | 3 parts |
| Coronate L (manufactured by NIPPON | |
| POLYURETHANE INDUSTRY CO., LTD.) | |

-continued

| | |
|---|---|
| alpha-Alumina<br>Average particle size 0.1 μm<br>HIT60 (manufactured by Sumitomo Chemical<br>Co., Ltd.) | 1 part |
| Butyl stearate | 1 part |
| Stearic acid | 1 part |
| Methyl ethyl ketone | 100 parts |
| Cyclohexanone | 50 parts |
| Toluene | 50 parts |
| Coating solution composition for forming backing layer (1): | |
| Carbon black 1<br>Average primary particle size: 17 nm<br>DBP oil absorption amount: 75 ml/100 g<br>pH: 8.0<br>Specific surface area by BET method: 220 m²/g<br>Volatile content: 1.5%<br>Bulk density: 15 lbs/ft² (240 kg/m²) | 100 parts |
| Carbon black 2<br>Average primary particle size: 100 nm<br>DBP oil absorption amount: 67 ml/100 g<br>pH: 8.5<br>Specific surface area by BET method: 20 m²/g | 100 parts |
| alpha-Alumina<br>Particle size 0.2 μm | 0.1 parts |
| Nitrocellulose resin | 100 parts |
| Polyester polyurethane resin<br>Nippollan (manufactured by NIPPON<br>POLYURETHANE INDUSTRY CO., LTD.) | 30 parts |
| Copper oleate | 10 parts |
| Copper phthalocyanine | 10 parts |
| Barium sulfate (precipitating) | 5 parts |
| Methyl ethyl ketone | 500 parts |
| Toluene | 500 parts |

Preparation of Tape-Like Magnetic Recording Medium:

The components of the magnetic layer coating solution and the nonmagnetic coating solution were respectively kneaded by an open kneader and dispersed in a sand mill, and these solutions were filtered through a filter having an average pore diameter of 1 μm, thereby a magnetic layer-coating solution and a nonmagnetic layer-coating solution were obtained.

The thus-obtained nonmagnetic layer-coating solution and magnetic layer-coating solution were simultaneously multilayer-coated on a polyethylene naphthalate support 1 having a thickness of 5 μm, a center line average roughness of the magnetic layer-coating surface of 4.0 nm, and projections having a height of 270 nm or higher of 20 per 100 cm². The nonmagnetic layer-coating solution was coated in a dry thickness of 1.5 μm, immediately thereafter the magnetic layer-coating solution was coated on the nonmagnetic layer in a dry thickness of 0.1 μm.

The coated layers were subjected to orientation with a cobalt magnet having a magnetic force of 300 T·m (3,000 G) and a solenoid having a magnetic force of 150 T·m (1,500 G) while both layers were still wet. After drying, the layers were subjected to surface treatment by a calender of 7 stages comprising metal rolls and epoxy resin rolls at 40° C. and a velocity of 200 m/min. Thereafter, a backing layer having a thickness of 0.5 μm was coated. The obtained web was slit to a width of 12.65 mm, thus a magnetic tape was obtained.

Example 2

A magnetic tape was prepared in the same manner as in Example 1 except for changing the thickness of the magnetic layer to 0.05 μm.

Comparative Example 1

A magnetic tape was prepared in the same manner as in Example 1 except that carbon black 3 shown below was used in the coating solution composition for forming backing layer (1) in place of carbon black 2.
  Carbon Black 3: 100 Parts
  Average primary particle size: 270 nm
  DBP oil absorption amount: 30 ml/100 g
  pH: 8.5
  Specific surface area by BET method: 10 m²/g Comparative Example 2

A magnetic tape was prepared in the same manner as in Example 1 except that polyethylene naphthalate support 2 shown below was used in place of polyethylene naphthalate support 1.
  Polyethylene Naphthalate Support 2:
  Center line average roughness: 6.8 nm
  Projections having a height of 270 nm or higher per 100 cm²: 150

Comparative Example 3

A magnetic tape was prepared in the same manner as in Example 1 except that polyethylene naphthalate support 3 shown below was used in place of polyethylene naphthalate support 1.
  Polyethylene Naphthalate Support 3:
  Center line average roughness: 8.0 nm
  Projections having a height of 270 nm or higher per 100 cm²: 30.

The characteristics of the above-manufactured magnetic tapes are shown in Table 1 below.

TABLE 1

| Example No. | Ra (nm) | Rsk | Rz (nm) | Magnetic Layer Thickness (μm) |
|---|---|---|---|---|
| Example 1 | 2.7 | 0.35 | 37 | 0.1 |
| Example 2 | 2.0 | 0.1 | 38 | 0.05 |
| Comparative Example 1 | 2.5 | −1.5 | 37 | 0.1 |
| Comparative Example 2 | 2.7 | 1.3 | 35 | 0.1 |
| Comparative Example 3 | 3.5 | 0.3 | 80 | 0.1 |

The thickness of each magnetic layer was measured as follows.

A sample was cut out of each tape-like magnetic recording medium in the thickness of about 0.1 μm in the machine direction with a diamond cutter, the sample was observed with a transmission type electron microscope of 30,000 magnifications and a photograph of each sample was taken. The print size of the photograph was A4 size. The present inventors paid attentions to the differences of the shapes of the ferromagnetic powder and the nonmagnetic powder of the magnetic layer and the nonmagnetic layer in the photograph, lined on the surface of the magnetic layer and at the interface between the magnetic layer and the nonmagnetic layer, and measured the distance of the lines by the image processing apparatus JBAS2 (manufactured by Zeiss Corp.).

The performances of the samples were evaluated as follows.

Each sample prepared in Examples 1 and 2 and Comparative Samples 1, 2 or 3 was wound around an LTO reel, and electromagnetic characteristics (SNR), an error rate and durability were evaluated. Electromagnetic characteristics and number of DO (dropout) were evaluated by writing signals of 130 kfci with a 25 μm wide write head and reproducing the signals with a 5 μm wide MR head. An error rate in the case of writing random signals with 8/9 (0,4) EPR4 code and reproducing the signals was measured. (In the following Table 2, 1E-7 means $1\times10^{-7}$.) With respect to DO, the number of times of the output reduction of 65% or more per 1 m was measured. Durability was evaluated by repeating the operation of reading 100 MB data written at the position of 500 m from BOT and returning to BOT with a modified LTO drive manufactured by IBM Co., Ltd. The results of evaluations obtained are shown in Table 2 below.

TABLE 2

| Example No. | SNR (dB) | Initial Error Rate | Number of DO (number/m) | Durability |
|---|---|---|---|---|
| Example 1 | 27 | 1E-7 | 50 | Completed the course of 300 passes. |
| Example 2 | 29 | 5E-8 | 5 | Completed the course of 300 passes. |
| Comparative Example 1 | 18 | 3E-4 | 560 | Stopped at 13th passes. |
| Comparative Example 2 | 22 | 1E-5 | 1,500 | Completed the course of 300 passes. |
| Comparative Example 3 | 16 | 2E-4 | 460 | Completed the course of 300 passes. |

As shown in Table 2, the samples in Examples 1 and 2 were excellent in SNR and completed the course in the durability evaluation as well, further the occurrence of DO and error rate were low. However, the sample in Comparative Example 1, which was the similar tape to those in Examples 1 and 2 but the skewness was negative (concavities were predominant over convexities), showed the deterioration in noise. Moreover, since Ra was low, the smooth face was broad and the contact area with the sliding member was great, so that the surface of the tape was damaged and the sample stopped during running in the evaluation of durability. In the sample in Comparative Example 2, in which the skewness was 1.3 and the convexities Were too predominant, dropout occurred due to spacing loss at the convexities and the number of DO increased, so that the initial error rate increased. Even when the running characteristic was maintained and the convexities were lessened, the noise attributable to the surface property increased and the initial error rate was inferior if the surface roughness was great as the sample in Comparative Example 3.

As described above, the magnetic recording medium according to the present invention has the center line average roughness (Ra) of the magnetic layer measured with a laser interferometer of from 1 to 3 nm, the skewness (Rsk) of 0 or more and less than 1.0, and Rz of 40 nm or less. By this constitution, the present invention can provide a magnetic recording medium capable of achieving excellent running durability and electromagnetic characteristics.

This application is based on Japanese Patent application JP 2002-382582, filed Dec. 27, 2002, the entire content of which is hereby incorporated by reference, the same as if set forth at length.

What is claimed is:

1. A magnetic recording medium comprising:
   a support; and
   at least one magnetic layer containing a ferromagnetic powder and a binder,
   wherein a center line average roughness of the magnetic layer measured with a laser interferometer is from 1 to 3 nm, a skewness is 0 or more and less than 1.0, and a maximum difference of elevation of peak/valley is 50 nm or less.

2. The magnetic recording medium according to claim 1, wherein the magnetic layer has a thickness of from 0.01 to 0.15 μm.

3. The magnetic recording medium according to claim 1, wherein the magnetic layer has a thickness of from 0.05 to 0.13 μm.

4. The magnetic recording medium according to claim 1, which further comprises a nonmagnetic layer so that the magnetic layer, the nonmagnetic layer and the support are in this order.

5. The magnetic recording medium according to claim 1, wherein the magnetic layer has a coercive force of from 159 to 318 kA/m.

6. The magnetic recording medium according to claim 1, wherein the magnetic layer has a coercive force of from 2,000 to 4,000 Oe.

7. The magnetic recording medium according to claim 1, wherein the center line average roughness of the magnetic layer measured with a laser interferometer is from 2.0 to 3.0 nm.

8. The magnetic recording medium according to claim 1, wherein the skewness is 0 or more and less than 0.5.

9. The magnetic recording medium according to claim 1, wherein the maximum difference of elevation of peak/valley is 40 nm or less.

* * * * *